Patented Mar. 23, 1948

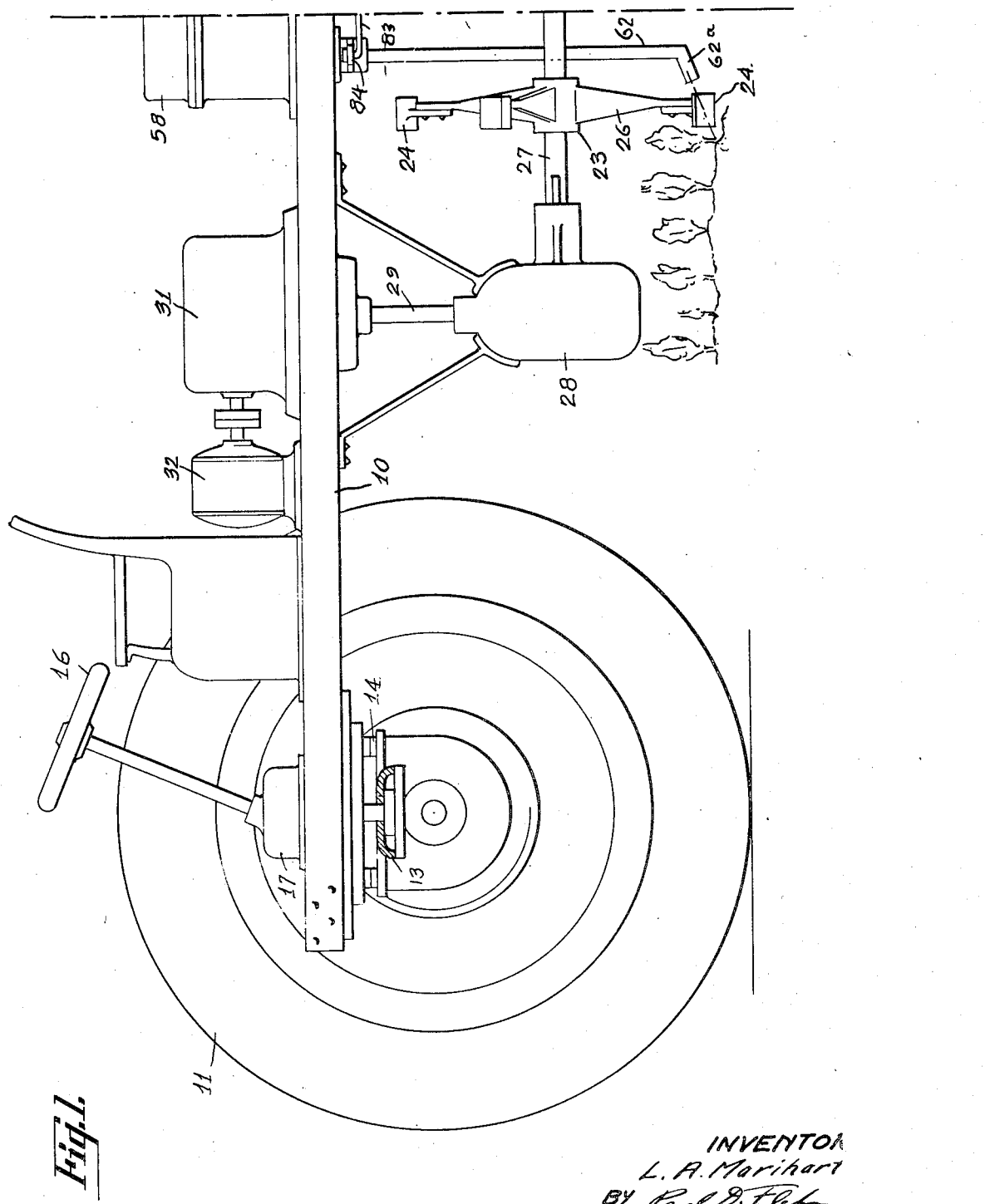

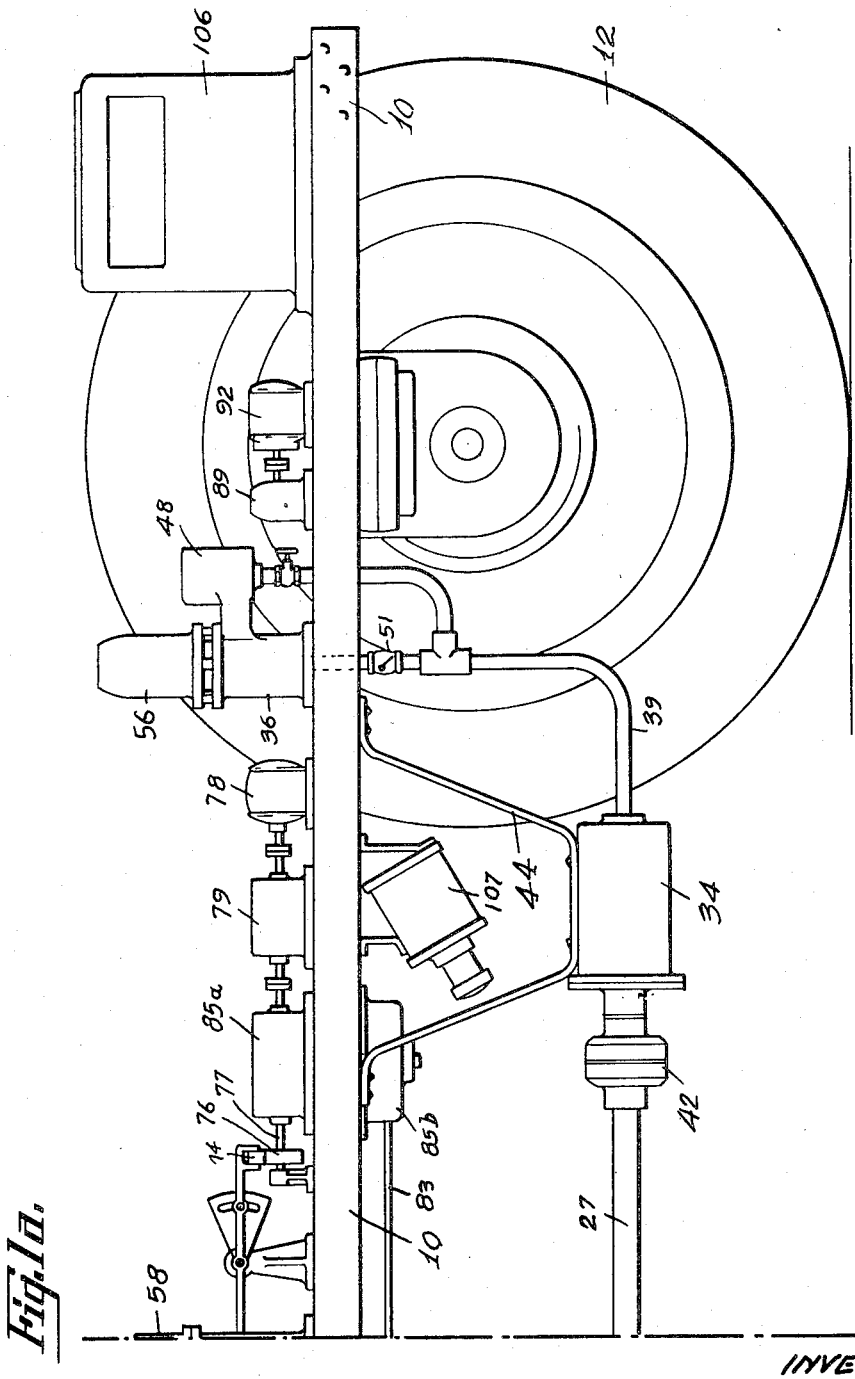

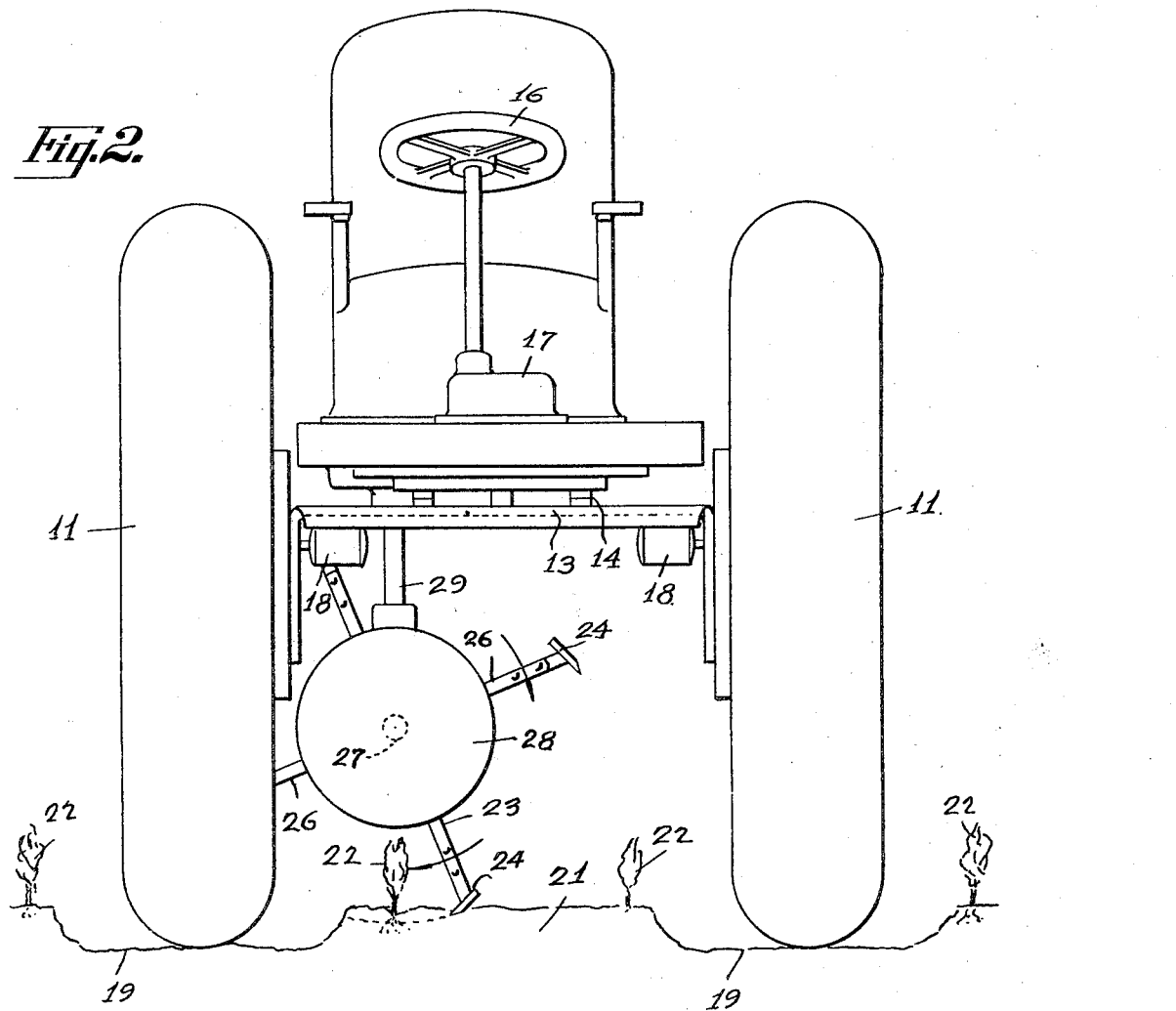

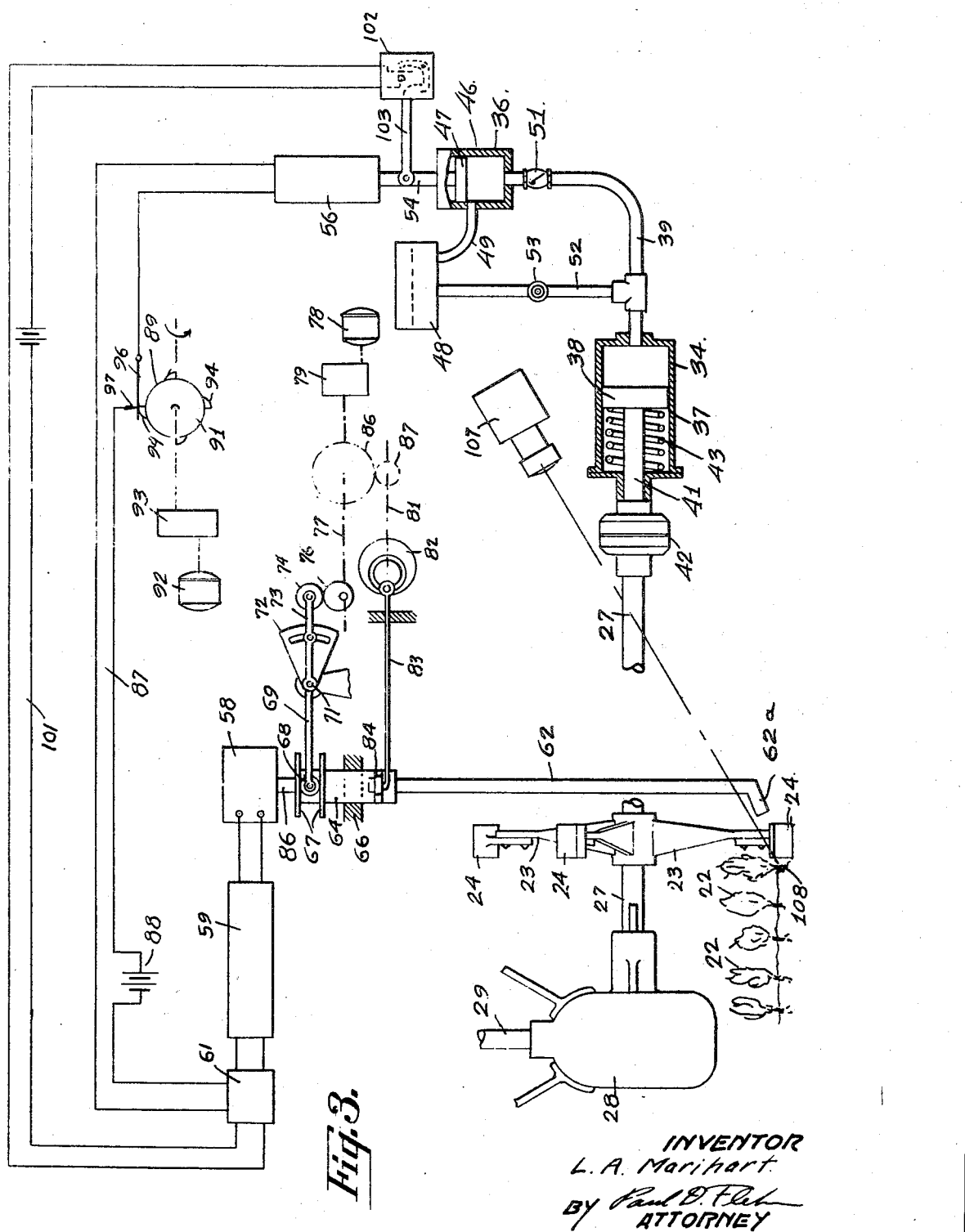

2,438,224

UNITED STATES PATENT OFFICE 2,438,224

PLANT THINNING MACHINE

Leo A. Marihart, Salinas, Calif.

Application November 2, 1942, Serial No. 464,184

6 Claims. (Cl. 97—15)

This invention relates generally to agricultural machines of the type used in the raising of various plants.

It is an object of the invention to provide novel means making it possible to automatically locate various plants, whereby various tools and appliances can be operated and controlled accordingly.

Another object of the invention is to provide for the automatic control of power driven ground engaging tools, whereby the action of the tool is controlled in such a manner as to eliminate or facilitate hand operations. In this connection the invention is characterized by the use of light sensitive means for controlling the action of the ground engaging tool, and which in turn is responsive to the characteristic color of certain portions of plants, whereby there is a discrimination between plants of different types, as for example weeds and desired vegetables or good and poor plants.

A further object of the invention is to provide a machine of the above character which is particularly useful for chopping out or thinning operations, and which for example when used for thinning out plants in a row, will automatically leave good plants at regular intervals.

Further objects of the invention will appear from the following description in which the preferred embodiment has been set forth in detail in conjunction with the accompanying drawing.

Referring to the drawing:

Figure 1 and Figure 1a, when taken together, constitute a side elevational view showing a machine incorporating the present invention.

Figure 2 is a front view of the machine as illustrated in Figures 1 and 1a.

Figure 3 is a diagram illustrating the various parts of the machine, and serving to better explain its operation.

Referring first to Figures 1, 1a, and 2, the machine is illustrated in semi-diagrammatic fashion, without detailed illustration of mechanisms like gears, etc., which can be supplied by those skilled in the art. In general the machine consists of a body or frame 10, carried by the front and rear wheels 11 and 12. The front wheels are carried by the cross connecting member 13, which in turn connects to the front end of the body through the fifth wheel arrangement 14. Steering means has been indicated by the steering wheel 16, operated through the steering gears 17. Motive means for driving these wheels can vary in practice, but for simplicity I have shown individual driving motors 18, which connect with the front wheels 11 through suitable gearing.

It will be evident that the wheels 11 can be spaced in accordance with the character of the operations to be performed, and according to the type of furrows formed between the rows of plants. In the arrangement illustrated in the drawing the wheels are spaced to operate within the adjacent furrows 19, and the raised bed 21 has been planted with two rows of plants 22.

The ground engaging tool, designated generally at 23, consists of the blades 24 mounted upon a spider or wheel 26 which in turn is fixed to the rotatable shaft 27. This shaft is generally horizontal and extends along the length of the vehicle, that is generally parallel to the direction of travel. One end of shaft 27 has a spline connection with driving gears 28, which in turn are driven by the vertical counter shaft 29. Shaft 29 is indicated as being driven by gearing 31, which in turn connects with a motor 32. It will be appreciated that this driving means is simply representative of suitable means for applying power to continuously rotate the ground engaging tool.

As means for recurrently and abruptly advancing the ground engaging tool relative to the vehicle, with return of the tool at a retarded rate, I have shown hydraulic means in the form of a hydraulic operative device 34, in conjunction with a hydraulic operator or actuator 36. Device 34 (Figure 3) can consist of a simple cylinder 37, fitted with the piston 38, and connected to a fluid supply pipe 39. Piston rod 41 is connected to the adjacent end of shaft 27, through the coupling 42. This coupling permits rotation of shaft 27, without corresponding rotation of piston rod 41. A compression spring 43 urges the piston 38 towards the right as viewed in Figure 3, and when this piston is moved to the left by introduction of liquid into the cylinder, the shaft 27 together with tool 23, is shifted to the left relative to the vehicle. The cylinder 37 is fixed with respect to the vehicle, as indicated by mounting bracket 44.

The hydraulic operator or actuator 36 can consist of a simple cylinder 46 (Figure 3), provided with the operating piston or plunger 47. The space below piston 47 is connected to a liquid storage tank 48, by pipe 49. Pipe 49 connects the space below the piston with the hydraulic device 34, through the check valve 51. This check valve permits flow of liquid from the actuator to device 34, but prevents back flow of liquid. A bleed pipe 52 also connects pipe 39 with the liquid reservoir 48. This pipe is provided with the throttling valve 53, whereby liquid introduced into device 34 may flow back to reservoir 48 through valve 53, at a controlled restricted rate. The piston rod 54 connects with piston 47 and extends to the motive device 56. This device can be mechanical or electrical, and is capable of applying a relatively rapid downward thrust to rod 54, whereby liquid displaced below piston 47 is delivered to device 34, to rapidly move piston 38 together with shaft 27 and tool 23, to the left as viewed in Figure 3. After tool 23 has been so suddenly moved relative to the vehicle, it returns at a relatively slow rate relative to the vehicle, by virtue of restricted flow of liquid from device 34 through the orifice formed by throttling valve 53 back to the reservoir 48.

The light sensitive means for controlling action of the tool 23, and particularly for controlling energizing of the motor device 56, can consist generally of a conventional light sensitive unit 58, as for example a unit making use of a photoelectric cell, which is connected to the input of an amplifier 59, with the output of this amplifier serving to operate the relay means 61. The amplifier can be of the electronic type, as is well known to those skilled in the art. The light sensitive unit 58 may be of the photoelectric type, making use of a suitable photoelectric tube or tubes. The light for operation of unit 58 is shown passing through an extended tube 62, which extends downwardly to the region of operation of the tool 23, where it is provided with a lateral extension 62a, the end of which is equipped with a suitable lens for picking up light. As is well known to those skilled in the art, a tube of this character can be utilized with a suitable arrangement of mirrors and lenses, whereby light beams picked up from a restricted area on which the lower end of the tube is focused is transmitted upwardly axially of the tube, to strike the photoelectric cell contained in the light sensitive unit 58.

In place of having the lower portion of tube 62a fixed with respect to the vehicle, it is preferable to impart a scanning action, thus extending the area over which the device is effective. As is known to those skilled in the art various types of scanning devices can be employed, but in this instance I have shown means whereby the lateral portion 62a is oscillated rapidly, and simultaneously reciprocated in a vertical direction. As shown in Figure 3 the upper end of tube 62 is shown attached to the sleeve or tube 64, which in turn is mounted for vertical sliding movement for rotation within the journals 66. Spaced collars 67 are shown mounted on sleeve 64, and between these collars there is a roller 68, carried by the rocker 69. This lever is covered by a fixed fulcrum 71, and is provided with a segmental shaped arm 72, which in turn is adjustably secured to the arm 73. A roller 74 carried by arm 73 engages the eccentric cam 76 which in turn is mounted upon the rotating shaft 77. A motor 78 drives shaft 77 through the gear 79. Another shaft 81 carries cam 82, which in turn serves to reciprocate a rod 83. This rod is attached to a lever 84, extending laterally from sleeve 64. Shaft 81 is driven at a relatively higher speed than shaft 77, as by means of gears 86 and pinion 87. In Figure 1a the mechanism comprising shaft 81, cam 82, and gears 86 and 87 are collectively designated at 85a and 85b.

With the scanning arrangement described above it will be evident that tube 62 is oscillated upon its axis at a relatively rapid rate, while at the same time it is reciprocated in a vertical direction whereby a substantial area is scanned, in place of having this tube focused upon a relatively small spot or area. Sleeve 64 is made free to move relative to unit 58, as for example it can be telescopically engaged with a tube 86, which leads to the interior of unit 58.

Relay 61 has a pair of contacts, which serve to control the electrical circuit 87. This circuit includes a source of current, represented by battery 88, the electrical motor device 56, and a contact timing device 89. The timing device 89 is indicated as comprising a cam wheel 91, driven by motor 92 through the gear train 93. The raised projections 94 on wheel 91 engage the contact element 96, and force this element into electrical connection with contact 97. This timing device is coordinated with advance of the vehicle. For example, if it is desired to insure the shifting of the tool 23 by the hydraulic device 34 at intervals located say about one foot apart, then the rotation of wheel 91 is timed accordingly, whereby after every foot of travel of the vehicle, contact elements 96 and 97 are closed for a short period of time, during which time operation of relay 61 by amplifier 59 and the light sensitive unit 58, serves to energize the motor device 56 to operate hydraulic device 34. When contacting elements 96 and 97 are open, it is evident that motor device 56 can not be operated, irrespective of operation of the relay 61. In order to insure complete operation of motor device 56, relay 61 can be of the interlocking type. Thus in this instance it is shown connected to a release circuit 101, which is controlled by the contacting unit 102. Contacting device 102 is shown connected by arm 103 to rod 54, whereby when rod 54 has completed its downward motion, the contacts within device 102 are closed to close the release circuit 101, and therefore release the relay 61. It may be noted at this point that the device 56 should be constructed so that it incorporates a spring or like means to return the rod 54 back to initial position. Similar results can be accomplished by placing a compression spring below the piston 47.

The diagrammatic layout of the parts shown in Figure 3, is indicated schematically in Figures 1, 1a, and 2. In addition to the parts described the vehicle is shown equipped with a prime motive unit 106, which can consist for example of an internal combustion engine driving an electric generator, which in turn is connected to the various electrical parts described above. It will be evident that suitable control means should be utilized in the various electrical connections, in order to control for example the starting and stopping of the vehicle, and starting and stopping of the various individual motors. The vehicle also carries one or more lamps 107, capable of directing one or more powerful concentrated beams of light upon a region of the ground from which reflected light is being picked up by tube 62.

While my machine is capable of a wide variety of uses, it will be described as applied to the thinning out of young plants, where the plants have been seeded in regular straight rows. In the past it has been customary to carry out this thinning by hand generally with a certain amount of weeding. For example in the growing of lettuce, when the plants have attained the height of say two and a half to three inches, it is customary to chop out the weeds and poorer plants by hand tools, and to thin out in such a manner as to leave plants standing at regular intervals, such as from ten to fourteen inches apart. My machine is capable of carrying out such thinning operations automatically, as follows: The machine advances at a predetermined speed over the rows of plants, between the furrows, and the tool 23 is continuously rotated at a sufficient speed so that the knives 24 undercut the soil and cut away the plants and adjacent weeds in the manner indicated in Figure 2. The path of movement of successive knives through the soil, is somewhat overlapping, so that the undercutting is continuous. Assuming that the timer is set for operation at intervals of about one foot apart, when the vehicle has advanced a predetermined distance, contacting elements 96 and 97 are closed, and the relay 61 is now ready to receive an impulse from the amplifier 59. Assuming now that the tool approaches a good plant, which one would desire to leave, the soil falls away from the root of the plant substantially in the manner illustrated in Figure 3, and the light from the lamp 107 is focused upon that portion 108 of the stem of the plant which has been exposed by falling away of the soil. Also the general area of this stem portion 108 is scanned by the tube 62. A healthy plant will have a predetermined characteristic color to the stem portion 108, and this reflection is picked up to operate the light sensitive unit 58, whereby the amplifier 59 operates relay 61 to actuate the motor device 56, with the result that the hydraulic operator 36 operates the hydraulic device 34. Operation of device 34 serves to abruptly translate the tool 23 forwardly relative to the vehicle, thus causing this tool in its rotation to skip the good plant. Although the tool now moves backwardly (relative to the vehicle) to its initial position at a retarded rate, it actually does not move backwardly with respect to the ground, but is ultimately advanced to the next position for actuation.

It will be apparent that the machine described above can be adapted to a wide variety of agricultural uses. For example in place of thinning out plants, to leave good plants at regular intervals, it can be used for example for weeding or for general hoeing or cultivating, making use of the light sensitive means for the purpose of preventing the chopping out of the desired plants.

The arrangement described above constitutes in effect means for automatically locating plants and for controlling a machine accordingly. This principle can be employed in machines other than those having ground cultivating or chopping tools, as for example in machines for harvesting various crops, where it is possible to employ a light sensitive device for locating a plant with this device automatically controlling the action of various harvesting tools.

It will be evident that the light sensitive means can be modified to suit varied conditions of operation. For example it can be adjusted to operate by virtue of the intensity of reflection from the stem portion of the plant, or it can be made to operate from the upper leaf portions. Also colored light filters can be introduced to secure more definite discrimination with respect to color. However, as pointed out above, I prefer to operate responsive to the character of that portion of the stem lying immediately below the normal soil surface, because I have observed that this stem portion is more apt to have a characteristic color. The use of an artificial source of illumination is desirable, in order to make operation of the device immune from daylight. In fact, it is desirable to completely shroud the vehicle with a suitable screen or curtain, so that daylight is substantially excluded from the region of operation of the tool 23.

I claim:

1. In an agricultural machine, a rotatable tool having ground engaging means, a frame serving to support the tool for rotation and for general movement in a direction corresponding to the axis of rotation of the tool, the engaging means of the tool being adapted to undercut the soil along a row of plants, power means for driving the tool, actuating means for abruptly advancing the ground engaging means relative to the frame and in the direction of movement of the frame and for causing return of the same to normal position, whereby the ground engaging means skip an area of the row of plants, and light sensitive means for controlling said actuating means to provide skip intervals between intervals during which the ground engaging means operates on the ground.

2. In an agricultural machine, a rotatable tool, a frame serving to support the tool for rotation, the frame being adapted to travel along a row of plants with the axis of rotation of the tool disposed generally horizontal and in alignment with the direction of movement of the frame, the tool having hoe-like soil engaging elements adapted to undercut the soil along a row of plants, power means for rotating the tool, means for abruptly advancing the tool elements relative to the frame followed by return movement of the elements to a normal position, whereby the tool is caused to skip an area of the row of plants, and light sensitive means serving to control said last named means.

3. In an agricultural machine, a frame adapted to move along a row of plants, a shaft rotatably carried by the frame, the axis of the shaft being generally horizontal and extending in a direction corresponding to the direction of movement of the frame, a tool carried by the shaft, said tool including a plurality of circumferentially spaced hoeing elements adapted normally to successively undercut the ground along a row of plants, as the machine moves forwardly, actuating means for abruptly advancing the hoeing elements forwardly relative to the frame and for permitting said elements to return to a normal position after such advancing movement, and light sensitive means for controlling said actuating means for effecting skipping of plants at spaced intervals along the row being operated upon.

4. In an agricultural machine, a frame adapted to move along a row of plants, a shaft rotatably carried by the frame, the axis of the shaft being generally horizontal and extending in a direction corresponding to the direction of movement of the frame, a tool carried by the shaft, said tool including a plurality of circumferentially spaced hoeing elements adapted normally to successively undercut the ground along a row of plants, as the machine moves forwardly, actuating means for abruptly advancing the hoeing elements forwardly relative to the frame and for permitting said elements to return to a normal position after such advancing movement, and means for controlling said actuating means for effecting skipping of plants at spaced intervals along the row being operated upon, said last named means including light sensitive means responsive to light from plants skipped by the hoeing elements.

5. In an agricultural machine, a ground engaging tool, a frame adapted to be moved along a row of plants and serving to carry the tool, power means for driving the tool to effect continual engagement with the ground along an area occupied by a row of plants, said tool being adapted to undercut and displace soil from regions in front of a plant whereby a portion of the plant stem normally below the soil level is exposed, and light sensitive means for causing the tool to recurrently skip ground areas occupied by desired plants, said means operating responsive to reflection of light from said exposed portions of the plant stem.

6. In an agricultural machine, a tool having ground engaging means, a frame serving to support the tool for movement along a row of plants, power means for driving the tool, light sensitive means for controlling driving of the tool, said last means being directed to receive light from plants in the row, and from an area which at any one instant is limited, and means for effectively and recurrently shifting said area in a direction generally laterally of the row to thereby cause said light sensitive means to recurrently scan portions of said plants.

LEO A. MARIHART.

REFERENCES CITED

The following references are of record in the file of this patent:

UNITED STATES PATENTS

| Number | Name | Date |
| --- | --- | --- |
| 2,177,803 | Ferté et al. | Oct. 31, 1939 |
| 2,239,153 | Ledbetter et al. | Apr. 22, 1941 |